United States Patent
Fujino et al.

(10) Patent No.: US 11,932,771 B2
(45) Date of Patent: Mar. 19, 2024

(54) STRETCHABLE CONDUCTIVE PASTE AND FILM

(71) Applicant: NAMICS CORPORATION, Niigata (JP)

(72) Inventors: Taku Fujino, Niigata (JP); Toshiaki Ogiwara, Niigata (JP)

(73) Assignee: NAMICS CORPORATION, Niigata (JP)

( * ) Notice: Subject to any disclaimer, the term of this patent is extended or adjusted under 35 U.S.C. 154(b) by 0 days.

(21) Appl. No.: 18/026,484

(22) PCT Filed: Sep. 10, 2021

(86) PCT No.: PCT/JP2021/033270
§ 371 (c)(1),
(2) Date: Mar. 15, 2023

(87) PCT Pub. No.: WO2022/059608
PCT Pub. Date: Mar. 24, 2022

(65) Prior Publication Data
US 2023/0272238 A1    Aug. 31, 2023

(30) Foreign Application Priority Data
Sep. 18, 2020   (JP) .................. 2020-157322

(51) Int. Cl.
*C09D 11/52*    (2014.01)
*C09D 11/037*    (2014.01)
(Continued)

(52) U.S. Cl.
CPC ............ *C09D 11/52* (2013.01); *C09D 11/037* (2013.01); *C09D 11/102* (2013.01); *H01B 1/22* (2013.01)

(58) Field of Classification Search
CPC ..................................................... C09D 11/52
See application file for complete search history.

(56) References Cited

U.S. PATENT DOCUMENTS

2015/0137048 A1    5/2015 Critzer et al.
2016/0130471 A1    5/2016 Burrows et al.
(Continued)

FOREIGN PATENT DOCUMENTS

| JP | S6272749 A | 4/1987 |
|----|------------|--------|
| JP | S6272750 A | 4/1987 |

(Continued)

OTHER PUBLICATIONS

International Search Report (ISR) (and English language translation thereof) dated Nov. 16, 2021, issued in International Application No. PCT/JP2021/033270.
(Continued)

*Primary Examiner* — William D Young
(74) *Attorney, Agent, or Firm* — Holtz, Holtz & Volek PC

(57) ABSTRACT

A conductive paste that can reduce an increase in electrical resistance caused by stretching of a wiring when the wiring of an electrical circuit and/or an electronic circuit is formed on a surface of a stretchable and/or bendable base material. The stretchable conductive paste includes (A) surface-treated silver particles and (B) a thermoplastic resin. The (A) surface-treated silver particles include a surface-treated layer.

12 Claims, 1 Drawing Sheet

(51) Int. Cl.
*C09D 11/102* (2014.01)
*H01B 1/22* (2006.01)

(56) References Cited

U.S. PATENT DOCUMENTS

| | | |
|---|---|---|
| 2018/0346757 A1 | 12/2018 | Burrows et al. |
| 2018/0346758 A1 | 12/2018 | Burrows et al. |
| 2019/0077930 A1 | 3/2019 | Irie et al. |
| 2019/0185684 A1* | 6/2019 | Yamada ............... H05K 3/1283 |
| 2022/0363849 A1 | 11/2022 | Irie et al. |

FOREIGN PATENT DOCUMENTS

| | | |
|---|---|---|
| JP | H07150048 A | 6/1995 |
| JP | 2014151617 A | 8/2014 |
| JP | 2015065139 A | 4/2015 |
| JP | 2017505984 A | 2/2017 |
| JP | 2017533333 A | 11/2017 |
| JP | 2018104581 A | 7/2018 |
| JP | 2019031735 A | 2/2019 |
| JP | 2019123882 A | 7/2019 |
| WO | 2017154978 A1 | 9/2017 |
| WO | 2018070433 A1 | 4/2018 |
| WO | 2018159374 A1 | 9/2018 |

OTHER PUBLICATIONS

Written Opinion dated Nov. 16, 2021, issued in International Application No. PCT/JP2021/033270.

* cited by examiner

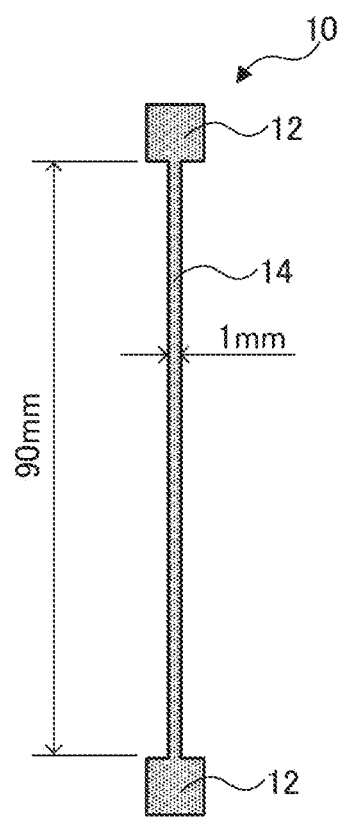

STRETCHABLE CONDUCTIVE PASTE AND FILM

FIELD OF THE INVENTION

The present invention relates to a stretchable conductive paste capable of forming a wiring of an electrical and/or an electronic circuit on a surface of a stretchable and/or bendable base material. The present invention also relates to a film comprising the stretchable conductive paste.

BACKGROUND ART

In recent years, conductive pastes have been developed to form thin-film conductors such as electrodes on stretchable and bendable base materials.

For example, Patent Document 1 describes a conductive paste used in applications forming stretchable wiring. Patent Document 1 describes that the conductive paste contains a conductive filler consisting of metal-coated particles with a metal layer on the surface of non-conductive core particles, a binder resin consisting of an elastomer, and an organic solvent. Patent Document 1 also describes that the surface of the conductive filler is not pre-surface-treated.

Patent Document 2 describes a stretchable conductor sheet used for electrical wiring, etc., and a paste for forming the stretchable conductor sheet used for forming the stretchable conductor sheet. Patent Document 2 describes that the conductive paste contains at least conductive particles, inorganic particles surface-treated with hydroxides and/or oxides of one or both Al and Si, a flexible resin having a tensile modulus of 1 MPa or more and 1000 MPa or less, and a solvent. Patent Document 2 also describes that the inorganic particles in the conductive paste are contained in an amount of 2.0 to 30% by mass based on 100% by mass of a total of the conductive particles and the inorganic particles, and the flexible resin is contained in an amount of to 35% by mass based on 100% by mass of a total of the conductive particles, the inorganic particles, and the flexible resin.

Patent Document 3 describes a resin composition containing (A) conductive particles, (B) a thermoplastic polyurethane resin with a 100% modulus of 7 MPa or more, and (C) a solvent. Patent Document 3 describes a resin composition in which the ratio of (A) conductive particles to the sum of (A) conductive particles and (B) a thermoplastic polyurethane resin is 90 weight percent to less than 100 weight percent.

Patent Document 4 describes a conductive paste containing surface-treated silver-coated alloy powder as a forming material for an external electrode of an electronic component. Patent Document 4 describes that the surface-treated silver-coated alloy powder consists of alloy particles, a silver-coated layer covering the alloy particles, and a surface-treated layer covering the silver-coated alloy particles composed of the alloy particles and the silver-coated layer.

Patent document 1: WO 2018/159374 A
Patent document 2: WO 2017/154978 A
Patent document 3: JP 2018-104581 A
Patent document 4: JP 2019-31735 A

DISCLOSURE OF THE INVENTION

In recent years, attempts have been made to form a wiring of an electrical and/or an electronic circuit on a surface of a stretchable and/or bendable base material. In the case of a wiring formed on such a base material, the wiring is also stretched because the base material is stretched and/or bent. Therefore, the electrical resistance of the wiring is greatly increased and the electrical circuit and/or the electronic circuit may fail to function.

Therefore, it is an object of the present invention to provide a conductive paste that can reduce the increase in electrical resistance caused by stretching of a wiring when the wiring of an electrical circuit and/or an electronic circuit is formed on a surface of a stretchable and/or bendable base material. It is also an object of the present invention to provide a film that can reduce the increase in electrical resistance (sheet resistance) due to stretching of the film when the film is formed using the conductive paste.

To solve the above problems, the present invention has the following configurations.

(Configuration 1)

Configuration 1 of the present invention is a stretchable conductive paste comprising (A) surface-treated silver particles and (B) a thermoplastic resin, and (A) the surface-treated silver particles comprising a surface-treated layer.

(Configuration 2)

Configuration 2 of the present invention is the stretchable conductive paste of the configuration 1, wherein the surface-treated layer is a surface-treated layer with at least one selected from dodecylbenzene sulfonic acid, dodecanoic acid and oleic acid.

(Configuration 3)

Configuration 3 of the present invention is the stretchable conductive paste of the configuration 1, wherein the surface-treated layer is a surface-treated layer with dodecylbenzene sulfonic acid.

(Configuration 4)

Configuration 4 of the present invention is the stretchable conductive paste of any of the configurations 1 to 3, wherein the weight ratio of (A) the surface-treated silver particles to (B) the thermoplastic resin is 50:50 to 99:1.

(Configuration 5)

Configuration 5 of the present invention is the stretchable conductive paste of any of the configurations 1 to 4, wherein the average particle size of (A) the surface-treated silver particles is 0.1 to 20 microns.

(Configuration 6)

Configuration 6 of the present invention is the stretchable conductive paste of any of the configurations 1 to 5, wherein (B) the thermoplastic resin is at least one selected from a urethane resin and a polycarbonate resin.

(Configuration 7)

Configuration 7 of the present invention is the stretchable conductive paste of any of the configurations 1 to 6, wherein the stretchable conductive paste further comprising (C) a solvent.

(Configuration 8)

Configuration 8 of the present invention is a film comprising the stretchable conductive paste according to any one of the configurations 1 to 7.

The present invention can provide a conductive paste that can reduce the increase in electrical resistance due to stretching of wiring when the wiring of an electrical circuit and/or an electronic circuit is formed on the surface of a stretchable and/or bendable base material. The present invention can also provide a film that can reduce the increase in electrical resistance (sheet resistance) due to stretching of the film when the film is formed using the conductive paste.

BRIEF DESCRIPTION OF THE DRAWINGS

FIG. 1 is a schematic diagram showing an electrical resistance test pattern used in the evaluation of Examples and Comparative Example.

MODE FOR CARRYING OUT THE INVENTION

Embodiments of the present invention will be described in detail below. It should be noted that the following embodiment is for embodying the present invention, and is not intended to limit the scope of the present invention.

The present embodiment is a conductive paste containing (A) surface-treated silver particles and (B) a thermoplastic resin, and (A) surface-treated silver particles contain a surface-treated layer. In the conductive paste of the present embodiment, (A) surface-treated silver particles contain a surface-treated layer. When wiring of an electric circuit and/or an electronic circuit (it is also simply referred to as "wiring".) is formed on a surface of a stretchable and/or bendable base material using the conductive paste of the present embodiment, the increase in electrical resistance due to stretching of the wiring can be reduced. Therefore, the conductive paste of the present embodiment can be used to form wiring for applications of garments (for example, clothing with built-in biosensors) in which wiring is arranged, flexible hybrid electronics and the like.

Moreover, the conductive paste of the present embodiment can reduce the increase in electrical resistance caused by the stretching of wiring. Therefore, even when the wiring is bent (namely, uneven stretching of wiring), the increase in electrical resistance can be reduced. Therefore, when the conductive paste of the present embodiment is used, it can be said that the increase in electrical resistance due to bending of the wiring can be reduced even when a wiring of an electric circuit and/or an electronic circuit is formed on a surface of a bendable base material.

In the present specification, when a wiring of an electric circuit and/or an electronic circuit is formed on a surface of a stretchable and/or bendable base material, a conductive paste that can reduce the increase in electrical resistance due to stretching of the wiring is referred to as "stretchable conductive paste." That is, the stretchable conductive paste is a conductive paste that can form a wiring of an electric circuit and/or an electronic circuit with stretching. The conductive paste of the present embodiment is a stretchable conductive paste that can form the wiring of the electric circuit and/or the electronic circuit with stretching. In the present specification, the stretchable conductive paste of the present embodiment is sometimes simply referred to as a "conductive paste."

In the present specification, the term "stretchable and/or bendable base material" can be used to refer to fabric for constituting clothing, etc., materials that can be bent and/or stretchable such as resin flat plates, paper, metal foils, and flexible substrates such as flexible glass and ceramic. However, the base material for which wiring can be formed using the resin composition of the present embodiment is not limited to these but can be a base material containing other stretchable and/or bendable materials. Wiring can also be formed on a base material for which stretching and/or bending is not possible using the resin composition of the present embodiment.

Next, each component contained in the stretchable conductive paste of the present embodiment will be described.

The stretchable conductive paste of the present embodiment contains surface-treated silver particles as component (A).

The conductive particles used as the raw material for surface-treated silver particles contained in the stretchable conductive paste of the present embodiment are preferably silver particles. The conductive particles can contain at least one component other than silver selected from Au, Cu, Ni and Ti in a weight percentage range that does not greatly degrade the characteristics of the conductive particles (For example, a range of less than 50 weight percent, preferably 20 weight percent or less, and more preferably 10 weight percent or less.). Silver (Ag) has high electrical conductivity. Therefore, the conductive particles are preferably silver particles consisting of silver only. However, in the present specification, "silver particles consisting of silver only" means that they can contain impurities that are inevitably mixed. In the present specification, "a particle A consisting of metal A" means that the particle A can contain impurities unavoidably contained in addition to metal A. The same applies to components other than metal particles.

Surface-treated conductive particles (surface-treated silver particles) contained in the stretchable conductive paste of the present embodiment contain a surface-treated layer.

The surface-treated layer of the stretchable conductive paste of the present embodiment is preferably a surface-treated layer with at least one selected from dodecylbenzene sulfonic acid, dodecanoic acid and oleic acid. Among these, the surface-treated layer is more preferably a surface-treated layer with dodecylbenzene sulfonic acid. When the surface-treated layer of the surface-treated silver particles is the surface-treated layer with the predetermined material, it is possible to ensure that the increase in electrical resistance caused by stretching of the wiring is reduced when the wiring of the electrical circuit and/or the electronic circuit is formed on the surface of the stretchable and bendable base material using a stretchable conductive paste.

The method of forming a surface-treated layer with dodecylbenzene sulfonic acid, dodecanoic acid and/or oleic acid on the silver particles is known to those skilled in the art. Specifically, a surface-treated layer can be formed on the surface of silver particles by mixing and stirring the raw material silver powder (silver particles) with dodecylbenzene sulfonic acid, dodecanoic acid and/or oleic acid.

As the particle shape of the surface-treated conductive particles (surface-treated silver particles), for example, spherical or phosphorous flake-like particles can be used. The particle size of the surface-treated conductive particles can be specified by the cumulative 50% particle size of the all particles (D 50). In the present specification, D 50 is also referred to as the average particle size. The average particle size (D 50) can be obtained from the result of the particle size distribution measurement by the Microtrack method (laser diffraction scattering method).

The average particle size (D 50) of the surface-treated conductive particles (surface-treated silver particles) is preferably 0.1 to 20 micrometers, more preferably 0.2 to 15 micrometers, and even more preferably 0.5 to 10 micrometers in terms of tolerability to stretching and/or bending and workability. If the average particle size (D 50) is larger than the above range, problems such as clogging may occur during screen printing. In addition, if the average particle size is smaller than the above range, the particles may be over-sintered during firing and it may not be possible to sufficiently reduce the increase in electrical resistance associated with the elongation of the wiring to be formed.

In addition, the size of surface-treated conductive particles (surface-treated silver particles) can be expressed as a BET value (BET specific surface area). The BET value of the conductive particles is preferably 0.1 to 5 $m^2/g$, more preferably 0.2 to $m^2/g$, and even more preferably 0.5 to 3 $m^2/g$.

The stretchable conductive paste of the present embodiment contains a thermoplastic resin as a component (B).

In the stretchable conductive paste of the present embodiment, the thermoplastic resin is preferably at least one selected from urethane resin and polycarbonate resin. Since the thermoplastic resin is urethane resin and/or polycarbonate resin, more appropriate stretchability can be imparted to the wiring to be formed.

Preferably, the urethane resin that can be used as the thermoplastic resin is at least one selected from ether urethane resin, ester urethane resin, adipate urethane resin, caprolactane urethane resin, and carbonate urethane resin. By using these urethane resins, it can be ensured that more suitable stretchability is imparted to the wiring to be formed.

The stretchable conductive paste of the present embodiment can contain resins other than urethane resins or polycarbonate resins, such as other thermoplastic resins, thermosetting resins and/or photo-curing resins, to the extent that it does not prevent the effect of the present embodiment. However, in order to obtain a suitable wiring, the resin contained in the stretchable conductive paste of the present embodiment is preferably a resin consisting only of the aforementioned urethane resin, a resin consisting only of polycarbonate resin, or a resin consisting only of a mixture thereof.

When the stretchable conductive paste of the present embodiment contains surface-treated silver particles with a surface-treated layer of dodecylbenzene sulfonic acid and a thermoplastic resin of urethane resin, the increase in electrical resistance due to stretching of the wiring can be more reliably reduced when the wiring is formed using the conductive paste. It is inferred that such an effect is a synergistic effect caused by the aforementioned predetermined component (A) (surface-treated silver particles) and component (B) (thermoplastic resin), but the present invention is not bound by such inference.

In the stretchable conductive paste of the present embodiment, the weight ratio of the surface-treated silver particles to the thermoplastic resin (surface-treated silver particles: thermoplastic resin) is preferably 50:50 to 99:1, more preferably 60:40 to 98:2, more preferably 70:30 to 96:4, and especially more preferably 75:25 to 95:5. When the weight ratio of the surface-treated silver particles to the thermoplastic resin contained in the conductive paste is within the predetermined range, appropriate electrical resistance and stretchability can be imparted to the wiring to be formed.

The stretchable conductive paste of the present embodiment can further contain a solvent as component (C).

The solvent contained in the conductive paste is not particularly limited as long as it is a solvent capable of dissolving a predetermined thermoplastic resin. In the conductive paste of the present embodiment, the solvent is preferably at least one selected from cyclohexanone, dimethylformamide, dimethylacetamide, benzyl alcohol, dimethylpropanamide and isophorone. The solvent is more preferably dimethylpropanamide or isophorone. By using the predetermined solvent, the predetermined resin (For example, urethane resin and polycarbonate resin) can be reliably dissolved. As a result, screen printing and the like of the resin composition for wiring formation can be facilitated.

The amount of solvent added is 20 to 500 parts by weight, preferably 50 to 400 parts by weight, and more preferably 80 to 300 parts by weight relative to 100 parts by weight of the thermoplastic resin. Usually, the thermoplastic resin can be properly dissolved by using a solvent whose weight is about 1 to 3 times (preferably 2 to 2.5 times) the weight of the thermoplastic resin.

The solvent can be added to the resin composition as needed to adjust the viscosity of the resin composition.

The stretchable conductive paste of the present embodiment can contain components other than the resin composition described above to the extent that it does not interfere with the effect of the present embodiment or to improve the effect of the present embodiment. For example, the conductive paste of the present embodiment can further contain at least one selected from inorganic pigments, organic pigments, silane coupling agents, leveling agents, thixotropic agents and defoaming agents.

The present embodiment is a film-like cured product of the stretchable conductive paste described above. In the present specification, a film-like cured product is sometimes simply referred to as a "film". The present embodiment is a film containing the stretchable conductive paste described above.

A "film" in the present specification refers to a solidified pattern having a shape of a flat plate coated on the surface of a predetermined base material. Examples of films include planar conductive patterns and wiring patterns of electrical and/or electronic circuits.

In the present specification, the pattern of the above-mentioned stretchable conductive paste printed in a flat shape by means of screen printing or the like is sometimes referred to as a "film-like composition". A cured film can be obtained by heat treatment of the film-like composition.

The stretchable conductive paste of the present embodiment can be formed into a shape of a wiring of an electric circuit and/or an electronic circuit by means of screen printing or the like and cured to form the wiring of the electric circuit and/or the electronic circuit on a surface of a base material that can be stretched and/or bent, which can reduce the increase in electrical resistance (sheet resistance) due to stretching of the wiring. The temperature and time for curing the conductive paste can be appropriately selected depending on the type of thermoplastic resin contained in the resin composition. The temperature and time for curing the conductive paste can be determined by adjusting as appropriate, taking into account the heat tolerance of the base material. For example, the temperature and time for curing the conductive paste can be from 5 to 60 minutes at 60 to 180 degrees C., preferably from 5 to 60 minutes at to 140 degrees C., and more preferably from 20 to 40 minutes at 110 to 130 degrees C.

Wiring can be formed on the surface of a garment by applying the stretchable conductive paste of the present embodiment to the surface of the cloth to be used as the material for the garment in a predetermined pattern and curing it. When the stretchable conductive paste of the present embodiment is used, a wiring can be formed as a conductive pattern on a garment that can be stretched and/or bent. The stretchable conductive paste of the present embodiment can form a wiring, for example, for a garment with a built-in biosensor.

By using the stretchable conductive paste of the present embodiment, a wiring can be formed on a surface of a flexible substrate, such as plastic, paper, metal foil, and flexible glass and ceramic. Therefore, the stretchable conductive paste of the present embodiment can be used to form a wiring for applications such as flexible hybrid electronics.

When wiring is formed using the stretchable conductive paste of the present embodiment, the initial electrical resistance (X) (electrical resistance before stretching) of a wire with a length of 90 mm, a width of 1 mm and a film thickness of 20 micrometers is preferably 20 ohms or less (specific resistance of 444 micro-ohm-cm or less), more preferably 15 ohms or less (specific resistance of 333 micro-ohm cm or less), and even more preferably 10 ohms or less (specific resistance of 222 micro-ohm cm or less). The predetermined range of initial electrical resistance (X) (and specific resistance) allows the wiring to be used as a wiring for applications such as clothing and flexible hybrid electronics, even considering the stretching of wiring.

When a wiring is formed using the stretchable conductive paste of the present embodiment, the ratio of an electrical resistance (Y) of the wiring when the wiring is extended by 100% (when the wiring is extended to twice the initial length) to an initial electrical resistance (X) (the electrical resistance change ratio (Y/X)) is preferably 1000 or less, more preferably 500 or less, more preferably 350 or less, and especially preferably 250 or less. When the electrical resistance change ratio (Y/X) is less than the predetermined ratio, it can be used as wiring for applications such as garments with a wiring and flexible hybrid electronics.

The stretchable conductive paste of the present embodiment can be produced by mixing the above-mentioned (A) surface-treated silver particles and (B) thermoplastic resin and possibly other components (for example, (C) solvent) into a mixer such as a planetary stirring machine, a dissolver, a bead mill, a grinding kneader, a three-roll mill, a rotary mixer, or a twin-screw mixer, and mixing these components. In this manner, the conductive paste can be prepared suitable for screen printing, immersion, other desired coating film or wiring formation methods.

The viscosity of the stretchable conductive paste of the present embodiment can be adjusted to a viscosity that can be appropriately used for a predetermined coating film or wiring formation method such as screen printing. The adjustment of the viscosity can be made by properly controlling the amount of solvent.

The viscosity of the stretchable conductive paste of the present embodiment is preferably 10 to 800 Pa·second (measured at 1 rpm) and more preferably 50 to 600 Pa·second (measured at 1 rpm). The phrase "(measured at 1 rpm)" of the viscosity indicates that the measurement was performed at 1 rpm of rotating speed. In the present specification, the viscosity is the value measured using a Brookfield viscometer: Type B (manufactured by Brookfield) at 25 degrees C.

By using the stretchable conductive paste of the present embodiment, it is possible to provide a conductive paste that can reduce the increase in electrical resistance caused by stretching of a wiring when the wiring of an electrical circuit and/or an electronic circuit is formed on the surface of a stretchable and/or bendable base material by means such as screen printing.

Examples

Hereafter, the stretchable conductive paste of the present embodiment will be specifically described with reference to the examples, but the present embodiment is not limited to these.

<Materials and Preparation Ratio of Conductive Paste>

Tables 1 and 2 show the composition of the stretchable conductive pastes of Examples and Comparative Example. The conductive pastes of Examples and Comparative Example are resin compositions consisting of silver particles (surface-treated silver particles), a thermoplastic resin and a solvent.

(Silver Particles)

Table 3 shows the manufacturer and model number, surface treatment agent for forming a surface-treated layer, average particle size (D 50), tap (TAP) density, and specific surface area of the silver particles A to E used in the Examples and Comparative Example. The silver particles A to D were made in-house as described below. The silver particles A to D are surface-treated silver particles having a surface-treated layer. The silver particles E are silver particles having no surface-treated layer. A commercial product was purchased and used as the silver particles E. Tap density is a bulk density obtained after mechanical tapping of a container containing powder samples. Tap density can be measured by JIS Z 2512: 2012 "Metal Powder-Tapping Density Measurement Method". The particle shape of silver particles A to E is flaky.

(Silver Particles A)

Silver particles A was produced by surface treatment of silver powder by stirring a mixture of 1000 g of raw silver powder, 10 g of dodecylbenzene sulfonic acid and 10 g of dodecanoic acid, and 100 g of ethanol in a pot mill.

Particle shape of silver powder: flaky

Average particle size of silver powder (D 50): 0.89 micrometers

Tap density of silver powder: 2.29 g/cm$^3$

BET specific surface area of silver powder: 2.56 m$^2$/g (Silver Particles B)

Silver particles B was produced by surface treatment of silver powder with a mixture of 1000 g of raw silver powder, 10 g of dodecylbenzene sulfonic acid and poly (oxyethylene) oleyl ether and 100 g of ethanol by stirring in a pot mill.

Shape of silver powder particles: flaky

Average particle size of silver powder (D 50): 0.94 micrometers

Tap density of silver powder: 2.60 g/cm$^3$

BET specific surface area of silver powder: 2.04 m$^2$/g (Silver Particles C)

Silver particles C was produced by surface treatment of silver powder with a mixture of 1000 g of raw silver powder and 20 g of oleic acid by stirring in a pot mill.

Shape of silver powder particles: flaky

Average particle size of silver powder (D 50): 6.5 micrometers

Tap density of silver powder: 2.70 g/cm$^3$

BET specific surface area of silver powder: 1.00 m$^2$/g (Silver Particles D)

Silver particles D was produced by surface treatment of silver powder by stirring a mixture of 1000 g of raw silver powder and 20 g of oleic acid in a pot mill.

Particle shape of silver powder: flaky

Average particle size of silver powder (D 50): 3.7 micrometers

Tap density of silver powder: 3.10 g/cm$^3$

BET specific surface area of silver powder: 1.55 m$^2$/g

Thermoplastic polyurethane resin used in the Examples and Comparative Example is as follows:

Resin A: Ether based thermoplastic urethane resin T-8195N (Made by DIC Covestro Polymer, Ltd., 100% modulus=9.2 M Pa)

Resin B: Adipate ester based urethane resin P-1098 (Made by Dainichiseika Color & Chemicals Mfg. Co., Ltd., 100% modulus=13 M Pa)

The polyurethane resins used in Examples and Comparative Example were used as a polyurethane resin solution dissolved in a solvent 2.3 times the weight of the polyurethane resin. Therefore, for example, in Example 1, a polyurethane resin solution dissolved 6 parts by weight of polyurethane resin A to 14 parts by weight of the solvent (N, N-Dimethylacetamide) was used.

Solvents A and B used in Examples and Comparative Example are as follows. Solvents A and B were used to dissolve the polyurethane resin.

Solvent A. 3-methoxy-N, N-dimethylpropanamide (Trade name: KJCMPA (registered trademark)-100, manufactured by KJ Chemicals Corporation)

Solvent B: Isophorone (Daishin Chemical Co., Ltd.)

Next, the conductive paste was prepared by mixing the materials in the prescribed preparation ratios described above in a planetary mixer, dispersing them in a three-roll mill, and pasting them.

<Method for Measuring Viscosity>

The viscosity of the conductive pastes of Examples and Comparative Example were measured at a temperature of 25 degrees C. using a Brookfield Viscometer: Type B (manufactured by Brookfield). The viscosity was measured for each resin composition of Examples and Comparative Example at a rotation speed of 1 rpm.

<Measurement Method of Electrical Resistance Value and Specific Resistance>

On the surface of a polyurethane sheet, the conductive pastes of Examples and Comparative Example were printed by a screen printing machine to form an electrical resistance test pattern 10 (see FIG. 1) with 1 mm of width and 90 mm of length of a wiring section 14, and was heat-cured at 120 degrees C. for 30 minutes in a constant temperature dryer. The thickness of the cured product of the obtained pattern 10 for electrical resistance testing (hereafter, it is simply referred to as "electrical resistance test pattern 10".) was all 20 micrometers. The film thickness was measured using a surface roughness profile measuring machine (model number: Surfcom 1500 SD-2) manufactured by Tokyo Seimitsu Co., Ltd. The electrical resistance value when the electrical resistance test pattern 10 was not stretched was defined as "initial electrical resistance (X)". In addition, the electrical resistance of the wiring section 14 of the electrical resistance test pattern 10 was measured by measuring the electrical resistance between one pair of electrode sections 12 using a digital multimeter (model number; 2001) made by TFF Keithley Instruments Inc. Since the area of the electrode sections are large, the value of the electrical resistance obtained by measurement can be regarded as the electrical resistance of the wiring section 14. Tables 1 and 2 show the initial electrical resistance (X) of the Example and the Comparative Example.

Next, the electrical resistance (electrical resistance (Y) at 100% elongation) between a pair of electrode sections 12 was measured after the wiring section 14 of the electrical resistance test pattern 10 was elongated by 100% in the longitudinal direction (lengthened so that the length of the wiring section 14 is 180 mm) by stretching the polyurethane sheet. An Instron universal testing machine (model number 5566) was used for the elongation of the polyurethane sheets. From the measurement results, the electrical resistance change ratio (Y/X), which is the ratio of the electrical resistance at 100% elongation (Y) to the initial electrical resistance (X), was calculated. Tables 1 and 2 show the electrical resistance change ratio (Y/X) for the examples and the comparison examples.

<Measured Results for the Examples and the Comparison Examples>

The initial resistance (X) of Example 1 to 13 of the present embodiment was as low as 2.3 ohms to 7.15 ohms (specific resistance 51.1 micro-ohm·cm to 158.9 micro-ohm cm), and it is clear that it could be used as a wiring for an electric and/or an electronic circuits. The electrical resistance (Y) of Example 1 to 13 of the present embodiment at 100% elongation was 611 ohms to 862 ohms, and it became clear that it could be used as a wiring for an electric and/or an electronic circuits even at 100% elongation. In addition, the electrical resistance change ratio (Y/X) of Example 1 to 13 of the present embodiment was 85 to 304 (times), and the change ratio was about 350 times or less. The electrical resistance change ratio (Y/X) of 1000 times or less, preferably 500 times or less, is acceptable for a wiring.

After 100% elongation of the pattern 10 for the electrical resistance test of Example 1 to 13, the pattern was returned to its original length and the electrical resistance was measured, and it was confirmed that electrical resistances that were similar to the initial electrical resistances were obtained. Specifically, when the pattern was returned to its original length after stretching, the electrical resistance was within 3 to 4 times of the initial electrical resistance (For example, the initial resistances of 5.19 ohms and 5.56 ohms were restored to 18.71 ohms and 19.15 ohms, respectively.), which was not a problem value for a wiring of an electrical circuit and/or an electronic circuit.

On the other hand, the initial resistance (X) of Comparative Example 1 was as low as 4.56 ohms (specific resistance 101.3 micro-ohm cm), and before stretching, the pattern was usable as a wiring for an electrical and/or an electronic circuits. However, the electrical resistance (Y) of Comparative Example 1 at 100% elongation was as high as 98567 ohms, and the electrical resistance change ratio (Y/X) was 21616 (times). That is, the electrical resistance (Y) and the electrical resistance change ratio (Y/X) in Comparative Example 1 at 100% elongation were about 2 orders of magnitude higher than those in Examples 1 to 13. Therefore, it is clear that Comparative Example 1 could not be used as a wiring for an electrical and/or an electronic circuits at 100% elongation.

Based on the above, it is clear that, when the stretchable conductive paste of Examples 1 to 13 of the present embodiment was used, a wiring pattern with low specific resistance could be obtained, and even when the wiring pattern was stretched, the increase in electrical resistance value could be suppressed. Therefore, if the stretchable conductive paste of the present embodiment is used, it can be said that the increase in electrical resistance caused by stretching of a wiring can be reduced when the wiring of an electrical circuit and/or an electronic circuit is formed on the surface of a base material that can be stretched and/or bent.

TABLE 1

|  | Example 1 | Example 2 | Example 3 | Example 4 | Example 5 | Example 6 | Example 7 |
| --- | --- | --- | --- | --- | --- | --- | --- |
| Silver particles A (weight %) | 94 | 86 | 76 | | | | |
| Silver particles B (weight %) | | | | 94 | 86 | 76 | |
| Silver particles C (weight %) | | | | | | | 94 |
| Silver particles D (weight %) | | | | | | | |
| Silver particles E (weight %) | | | | | | | |
| Resin A (weight %) | 6 | 14 | 24 | | 14 | 24 | 6 |
| Resin B (weight %) | | | | 6 | | | |
| Solvent A (parts by weight) | 14 | 33 | 56 | 14 | 33 | 56 | 14 |
| Solvent B (parts by weight) | | | | | | | |
| Viscosity (Pa · second) | 482 | 396 | 301 | 462 | 343 | 278 | 540 |
| X: Initial electrical resistance (ohm) | 3.92 | 4.95 | 6.03 | 4.12 | 5.9 | 7.15 | 2.3 |
| Y: Electrical resistance at 100% elongation (ohm) | 860 | 767 | 640 | 862 | 773 | 611 | 700 |
| Electrical resistance change ratio (Y/X) | 219 | 155 | 106 | 209 | 131 | 85 | 304 |

TABLE 2

|  | Example 8 | Example 9 | Example 10 | Example 11 | Example 12 | Example 13 | Comparative Example 1 |
| --- | --- | --- | --- | --- | --- | --- | --- |
| Silver particles A (weight %) | 86 | 86 | 86 | 43 | 43 | 43 | |
| Silver particles B (weight %) | | | | 43 | | | |
| Silver particles C (weight %) | | | | | 43 | | |
| Silver particles D (weight %) | | | | | | 43 | |
| Silver particles E (weight %) | | | | | | | 86 |
| Resin A (weight %) | 14 | 6 | 24 | 14 | 14 | 14 | 14 |
| Resin B (weight %) | | | | | | | |
| Solvent A (parts by weight) | | 14 | 56 | 33 | 33 | 33 | 33 |
| Solvent B (parts by weight) | 33 | | | | | | |
| Viscosity (Pa · second) | 416 | 560 | 296 | 377 | 455 | 423 | 443 |
| X: Initial electrical resistance (ohm) | 4.68 | 3.96 | 5.54 | 5.42 | 3.54 | 3.9 | 4.56 |
| Y: Electrical resistance at 100% elongation (ohm) | 750 | 721 | 717 | 768 | 630 | 686 | 98567 |
| Electrical resistance change ratio (Y/X) | 160 | 182 | 129 | 142 | 178 | 176 | 21616 |

TABLE 3

| Product No. | Manufacturer | Agent for surface treatment | Average particle size (D50) (μm) | Tap density (g/cm³) | BET specific surface area (m²/g) |
|---|---|---|---|---|---|
| Silver particles A | — | Namics | Dodecylbenzene sulfonic acid and Dodecanoic acid | 0.89 | 2.29 | 2.56 |
| Silver particles B | — | Namics | Dodecylbenzene sulfonic acid and Poly (oxyethylene) oleyl ether | 0.94 | 2.6 | 2.04 |
| Silver particles C | — | Namics | Oleic acid | 6.5 | 2.7 | 1 |
| Silver particles D | — | Namics | Oleic acid | 3.7 | 3.1 | 1.55 |
| Silver particles E | HXR-AG | Nippon Atomized Metal Powders Corporation | (No surface treatment) | 2.4 | 4.8 | 0.4 |

DESCRIPTION OF REFERENCE NUMERALS

10: Electrical Resistance Test Pattern
12: Electrode Section
14: Wiring Section

The invention claimed is:

1. A stretchable conductive paste comprising (A) surface-treated silver particles and (B) a thermoplastic resin, wherein (A) the surface-treated silver particles comprise a surface-treated layer, wherein a weight ratio of (A) the surface-treated silver particles to (B) the thermoplastic resin is in a range of 50:50 to 95:5, and wherein the surface-treated layer is a surface-treated layer that is surface-treated with dodecylbenzene sulfonic acid.

2. The stretchable conductive paste according to claim 1, wherein an average particle size of (A) the surface-treated silver particles is 0.1 to 20 microns.

3. The stretchable conductive paste according to claim 1, wherein (B) the thermoplastic resin is at least one selected from a urethane resin and a polycarbonate resin.

4. The stretchable conductive paste according to claim 1, wherein the stretchable conductive paste further comprises (C) a solvent.

5. A film comprising a stretchable conductive paste according to claim 1.

6. The stretchable conductive paste according to claim 1, wherein when a wiring is formed using the stretchable conductive paste, a ratio (Y/X) of an electrical resistance (Y) of the wiring when the wiring is extended by 100% to an initial electrical resistance (X) of the wiring is 1000 or less.

7. A stretchable conductive paste comprising (A) surface-treated silver particles and (B) a thermoplastic resin, wherein (A) the surface-treated silver particles comprise a surface-treated layer, and wherein the surface-treated layer is a surface-treated layer that is surface-treated with dodecylbenzene sulfonic acid.

8. The stretchable conductive paste according to claim 7, wherein an average particle size of (A) the surface-treated silver particles is 0.1 to 20 microns.

9. The stretchable conductive paste according to claim 7, wherein (B) the thermoplastic resin is at least one selected from a urethane resin and a polycarbonate resin.

10. The stretchable conductive paste according to claim 7, wherein the stretchable conductive paste further comprises (C) a solvent.

11. A film comprising a stretchable conductive paste according to claim 7.

12. The stretchable conductive paste according to claim 7, wherein when a wiring is formed using the stretchable conductive paste, a ratio (Y/X) of an electrical resistance (Y) of the wiring when the wiring is extended by 100% to an initial electrical resistance (X) of the wiring is 1000 or less.

* * * * *